(12) United States Patent
Inoi

(10) Patent No.: US 6,461,760 B1
(45) Date of Patent: Oct. 8, 2002

(54) NON-AQUEOUS ELECTROLYTE SECONDARY BATTERY HAVING A ROLLED BODY THEREIN

(75) Inventor: Takayuki Inoi, Tokyo (JP)

(73) Assignee: NEC Tokin Corporation, Miyagi (JP)

( * ) Notice: Subject to any disclaimer, the term of this patent is extended or adjusted under 35 U.S.C. 154(b) by 113 days.

(21) Appl. No.: 09/638,966

(22) Filed: Aug. 15, 2000

(30) Foreign Application Priority Data

Aug. 18, 1999 (JP) .......................................... 11-231633

(51) Int. Cl.[7] .............................................. H01M 6/10
(52) U.S. Cl. ...................... 429/94; 429/163; 429/164; 429/176; 429/178; 429/186
(58) Field of Search .......................... 429/94, 164, 178, 429/186, 176, 163

(56) References Cited

U.S. PATENT DOCUMENTS

| | | | |
|---|---|---|---|
| 5,916,707 A | * | 6/1999 | Omaru et al. ................ 429/163 |
| 2001/0007729 A1 | * | 7/2001 | Kitoh et al. ................. 429/164 |

FOREIGN PATENT DOCUMENTS

| | | | |
|---|---|---|---|
| EP | 0 486 950 A1 | 5/1992 | .......... H01M/10/40 |
| EP | 0 622 862 A1 | 11/1994 | .......... H01M/10/40 |
| EP | 0 895 297 A1 | 2/1999 | .......... H01M/10/40 |
| JP | 09259857 | 10/1997 | ............ H01M/2/16 |
| JP | 09259866 A | 10/1997 | ............ H01M/4/02 |
| JP | 09283178 A | 10/1997 | .......... H01M/10/40 |

* cited by examiner

Primary Examiner—Patrick Ryan
Assistant Examiner—Angela J Martin
(74) Attorney, Agent, or Firm—Hayes Soloway P.C.

(57) ABSTRACT

A non-aqueous electrolyte secondary battery comprising: a case comprising a bottom and a sidewall; a rolled body comprising: a positive electrode comprising a first electric plate and a positive electrode active material applied on the first electric plate; a negative electrode comprising a second electric plate and a negative electrode active material applied on the second electric plate; and a separator inserted between the positive electrode and the negative electrode; wherein the rolled body is formed by laminating and rolling the positive electrode, the negative electrode, and the separator; and wherein the rolled body is enclosed in the body; non-aqueous electrolyte enclosed in the case; a header used for sealing the case; a plurality of positive electrode leads connecting the positive electrode and the header; a plurality of negative electrode leads connecting the negative electrode and a bottom of the case; and holding means for holding the rolled body so that the rolled body does not relatively move with respect to the case while keeping a gap between a lower terminal of the rolled body and the bottom of the case and a gap between an upper terminal of the rolled body and the header.

8 Claims, 3 Drawing Sheets

NON-AQUEOUS ELECTROLYTE SECONDARY BATTERY HAVING A ROLLED BODY THEREIN

BACKGROUND OF THE INVENTION

1. Field of the Invention

The present invention relates to a non-aqueous electrolyte secondary battery and particularly, to a structure of the non-aqueous electrolyte secondary battery having a rolled body therein.

2. Description of the Prior Art

In order to derive a large electric current from a non-aqueous electrolyte secondary battery, it is necessary to reduce an inner resistance due to electric leads. Therefore, it is also necessary to connect a plurality of electric leads with a rolled body to derive an electric current therefrom. In addition, in order to draw out these electric leads, it is necessary to define a gap between the rolled body and the bottom of a case and another gap between the rolled body and a header.

However, in a conventional non-aqueous electrolyte secondary battery, a structure as shown in FIG. 4 which is disclosed in JPA 9-259857 is popular. Referring to FIG. 4, although recess 204 is formed on the upper side of case 201, the purpose of forming recess 204 is not to hold rolled body 200 but to have recess 204 function as a receiver of a stress caused when caulking case 201 with header 203 to seal case 201.

In the conventional non-aqueous electrolyte secondary battery, rolled body 200 is merely enclosed in case 201, and there are free spaces over and under rolled body 200. Therefore, rolled body 200 may move freely inside case 201. Thus, when using the conventional non-aqueous electrolyte secondary battery, a relative position of rolled body 200 with respect to case 201 varies by vibration, and stresses are applied to both terminals of a plurality of negative electrode leads (not shown) connecting a lower terminal of rolled body 200 with a bottom of case 201 and terminals of a plurality of positive electrode leads (not shown) connection an upper terminal of rolled body 200 with header 203, resulting in that at least parts of these leads are disconnected and an inner resistance due to leads increases. In addition, when parts of positive electrode leads are disconnected, the disconnected leads contact with case 201, resulting in short circuit.

SUMMARY OF THE INVENTION

In order to overcome the aforementioned disadvantages, the present invention has been made and accordingly, has an object to provide a non-aqueous electrolyte secondary battery in which a rolled body does not relatively move with respect to a case.

According to an aspect of the present invention, there is provided a non-aqueous electrolyte secondary battery which comprises: a case comprising a bottom and a sidewall; a rolled body comprising: a positive electrode comprised of a first electric plate and a positive electrode active material applied on the first electric plate; a negative electrode comprised of a second electric plate and a negative electrode active material applied on the second electric plate; and a separator inserted between the positive electrode and the negative electrode; wherein the rolled body is formed by laminating and rolling the positive electrode, the negative electrode, and the separator; and the rolled body is enclosed in the body; non-aqueous electrolyte enclosed in the case; a header used for sealing the case; a plurality of positive electrode leads connecting the positive electrode with the header; a plurality of negative electrode leads connecting the negative electrode with a bottom of the case; and holding means for holding the rolled body so that the rolled body does not relatively move with respect to the case while keeping a gap between a lower terminal of the rolled body and the bottom of the case and a gap between an upper terminal of the rolled body and the header.

In the non-aqueous electrolyte secondary battery, the holding means may comprise: a first recess at least partially formed in the neighborhood of an upper end of the sidewall of the case; and a second recess at least partially formed in the neighborhood of a lower end of the sidewall of the case; wherein the first recess and the second recess hold the rolled body.

In the non-aqueous electrolyte secondary battery, the holding means may comprise: a first recess at least partially formed in the neighborhood of an upper end of the sidewall of the case; and a short-diameter portion formed in the neighborhood of a lower end of the sidewall of the case; wherein the first recess and a shoulder of the short-diameter portion hold the rolled body.

In the non-aqueous electrolyte secondary battery, the holding means may comprise: a first recess at least partially formed in the neighborhood of an upper end of the sidewall of the case; and a spacer disposed between the bottom of the case and the lower terminal of the rolled body; wherein the first recess and the spacer hold the rolled body.

The non-aqueous electrolyte secondary battery may further comprise: a spacer disposed between the first recess and the rolled body.

The non-aqueous electrolyte secondary battery may further comprise: an insulator disposed between the rolled body and the holding means.

These and other objects, features and advantages of the present invention will become more apparent in the light of the following detailed description of the best mode embodiments thereof, as illustrated in the accompanying drawings.

DETAILED DESCRIPTION OF THE PREFERRED EMBODIMENT

Preferred modes of embodiment according to the present invention will be described with reference to the accompanying drawings.

[Embodiment 1]

Figure 1A:
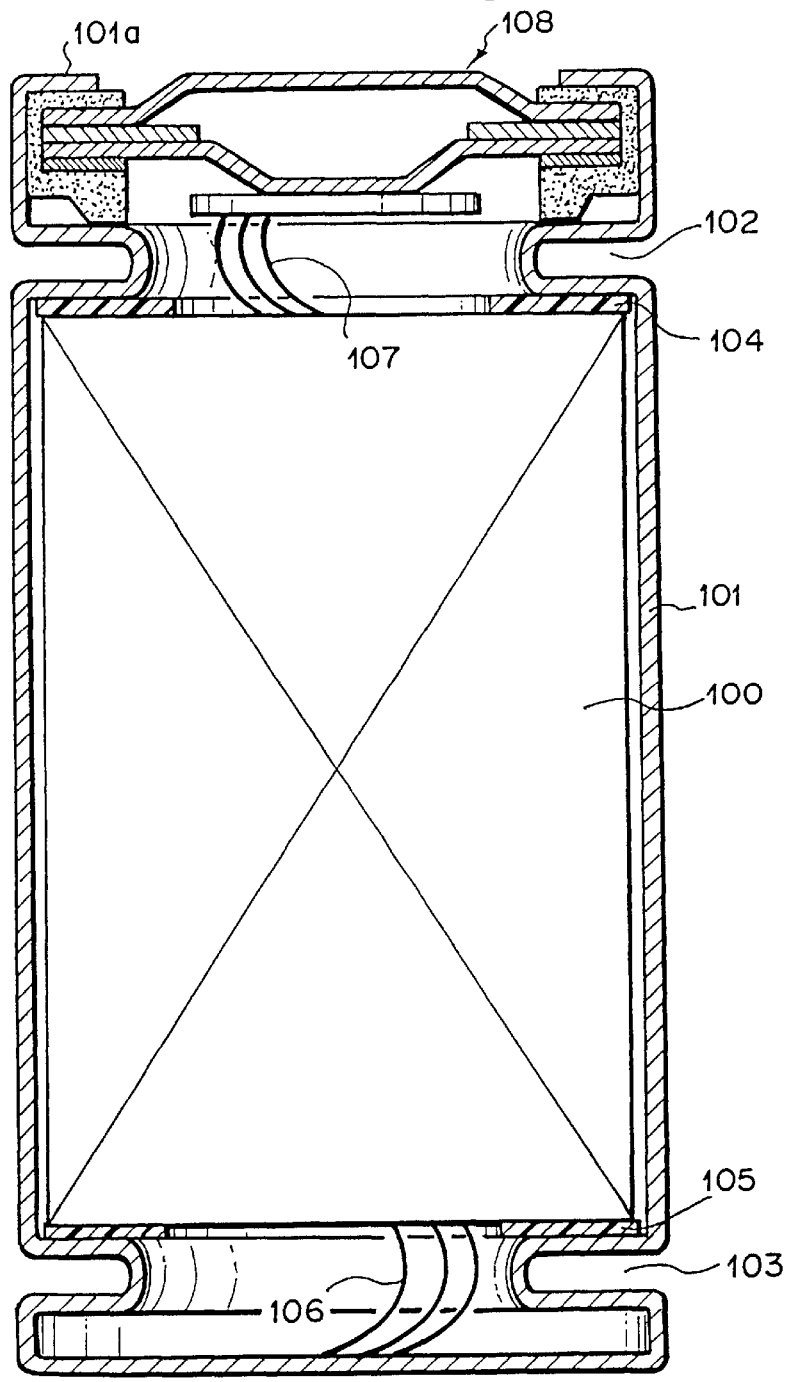
FIG. 1A is a cross sectional view showing a structure of a non-aqueous electrolyte secondary battery according to a first embodiment.

Referring to FIG. 1A, reference 100 represents a rolled body which is formed by rolling a positive electrode and a negative electrode while inserting a separator separating the positive electric electrode from the negative electric electrode. The positive electric electrode is formed by applying a positive electrode active material composed of lithium manganese compound oxides (LiMn$_2$O$_4$) to an electrode plate composed of an aluminum foil. The negative electric electrode is formed by applying a negative electrode active material composed of meso-carbon micro beads to an electrode plate composed of a copper foil. The separator is composed of a polypropylene.

Reference 101 represents a case. References 102 and 103 represent recesses formed at the neighborhoods of upper and lower ends of a sidewall of case 101, respectively. Recesses 102 and 103 may be formed fully or partly around case 101. Rolled body 100 is held between recesses 102 and 103.

Reference 104 and 105 represent insulator plates. Insulator plate 104 is inserted between rolled body 100 and recess 102. Similarly, insulator plate 105 is inserted between rolled body 100 and recess 103. Insulator plates 104 and 105 are ring-shaped.

Reference 106 represents negative electrode leads. A terminal of each negative electrode lead is connected with the negative electrode and the other terminal of the negative electrode lead is connected with a predetermined position on a bottom of case 101.

Figure 1B:
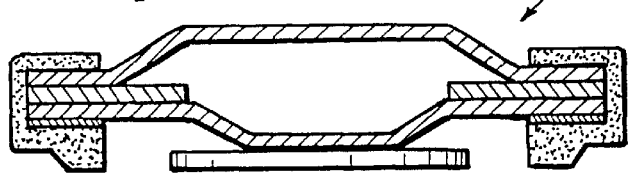
FIG. 1B is a cross sectional view showing a structure of a header according to the first embodiment.

Reference 107 represents positive electrode leads. A terminal of each positive electrode lead is connected with the positive electrode and the other terminal of the positive electrode lead is welded to a predetermined position of header 108 of which figure is illustrated in FIG. 1B.

In case 101, there is contained a non-aqueous electrolyte. An example of the non-aqueous electrolyte is a solution of ethylene carbonate and diethylene carbonate in a ration of 3 to 7 annexed with lithium phosphate hexafluorides (LiPF$_6$) as supporting salts. Case 100 is sealed by caulking case 100 with header 108.

The positive electrode of rolled body 100 is formed by applying a mixture of lithium manganese compound oxides (LiMn$_2$O$_4$) as positive electrode active materials and acetylene blacks as conductive materials to both sides or one side of an electrode plate having a thickness of 20 $\mu$m composed of an aluminum foil while using a poly(vinylidene fluoride) as a binder. The positive electrode so formed is 186 $\mu$m in thickness and 130 nm in width, including the aluminum foil.

The negative electrode of rolled body 100 is formed by applying a mixture of meso-carbon micro beads as negative electrode active materials and acetylene blacks as conductive materials to both sides or one side of an electrode plate having a thickness of 15 $\mu$m composed of a cupper foil while using a poly(vinylidene fluoride) as a binder. The negative electrode so formed is 175 $\mu$m in thickness and 135 nm in width, including the cupper foil.

Rolled body 100 is formed by rolling the positive electrode and the negative electrode while laminating them with an interposition of a separator of a width of 140 nm composed of a polypropylene and a polyethylene.

Reference 103 represents a lower recess. For example, if case 101 is 26 mm in diameter and 150 mm in height, lower recess 103 is formed at a position 6 mm apart from a lower end of the sidewall of case 101.

Next, steps of assembling the non-aqueous electrolyte secondary battery will be explained.

Before assembly, lower recess 103 is formed in case 101. Next, insulator plate 105 and rolled body 100 are inserted in case 101 until insulator plate 105 and rolled body 100 abut lower recess 103. Next, negative electrode leads 106 are resistance-welded to a predetermined position on the bottom of case 101. When performing the resistance welding, terminals of negative electrode leads 106 contact with the bottom with the aid of manipulation through a void of rolled body with a tool. Next, insulator plate 104 is put on rolled body 100, and upper recess 102 is formed at an upper portion of the sidewall of case 101 (for example, at a position 6 mm apart from a upper end of the sidewall of case 101) so that upper recess 102 and lower recess 103 hold rolled body 100 with an interposition of insulator plates 104 and 105. Next, positive electrode leads 107 are welded (for example, laser-welded) to a predetermined position of header 108, non-aqueous electrolyte is poured, header 108 is put on upper recess 102, and case 101 is sealed by caulking it.

[Embodiment 2]

Figure 2:
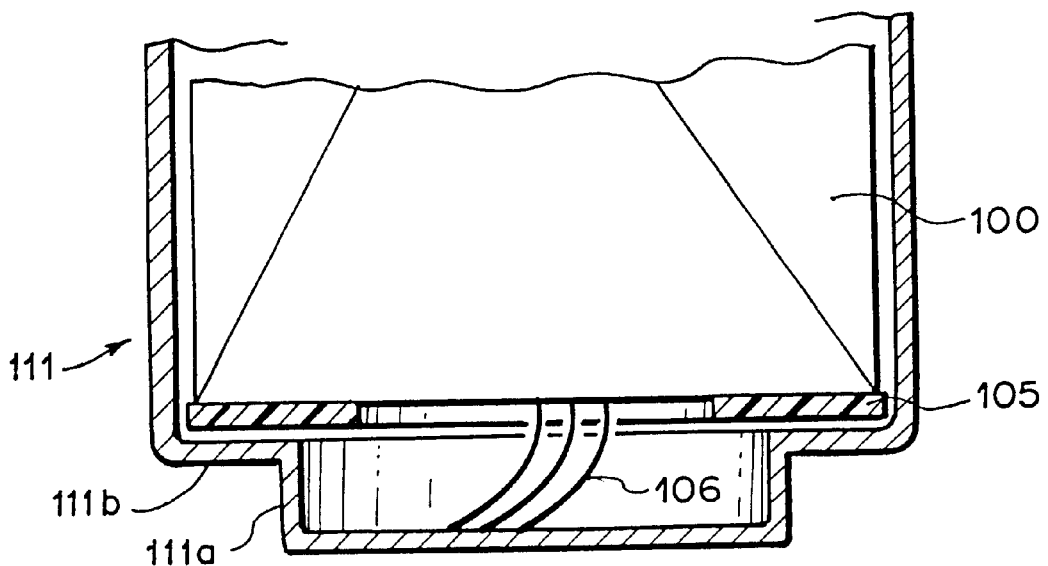
FIG. 2 is a partial cross sectional view showing a structure of a non-aqueous electrolyte secondary battery according to a second embodiment.

Referring to FIG. 2, the difference of the second embodiment from the first embodiment is that lower recess 103 is deleted and short-diameter portion 111$a$ which is shorter than a portion which accommodates rolled body 100 in diameter is introduced to compensate the deletion. Rolled body 100 is supported by shoulder 111$b$ of short-diameter portion 111$a$ with an interposition of insulator plate 105. The upper terminal of rolled body 100 is supported in the same way as the first embodiment.

Here, short-diameter portion 111$a$ may be formed fully or partly around case 101.

[Embodiment 3]

Figure 3:
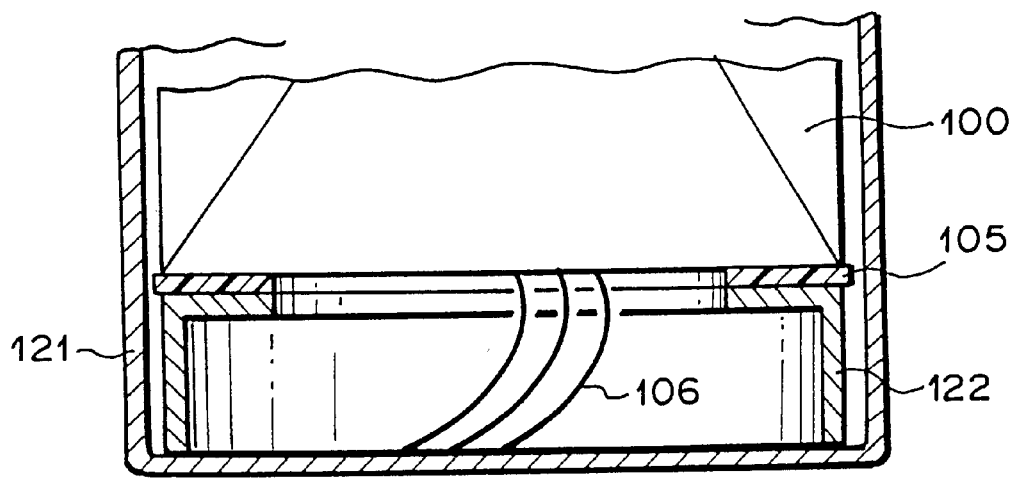
FIG. 3 is a partial cross sectional view showing a structure of a non-aqueous electrolyte secondary battery according to a third embodiment.
Figure 4:
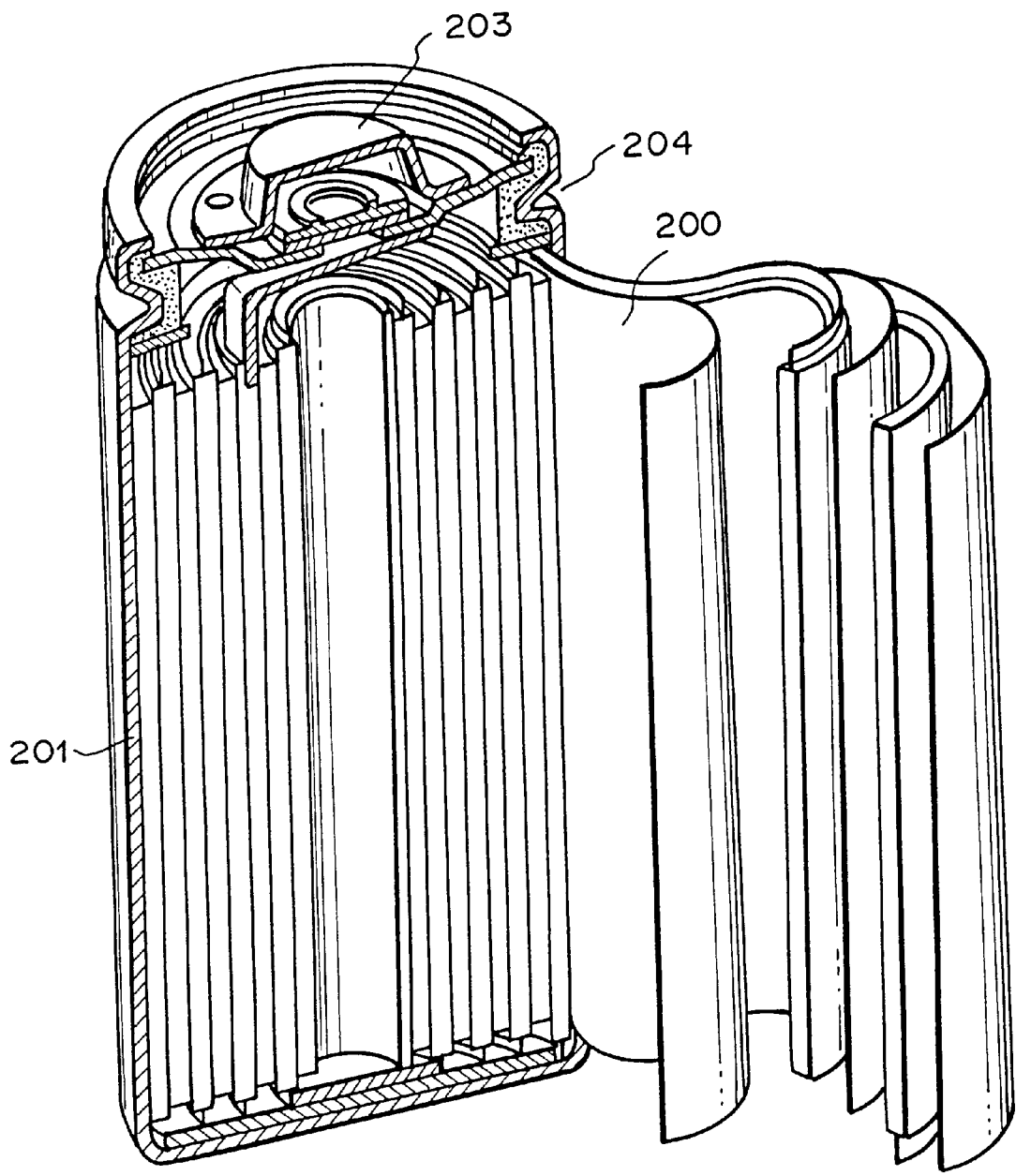
FIG. 4 is a perspective view showing a structure of a conventional non-aqueous electrolyte secondary battery.

Referring to FIG. 3 the difference of the third embodiment from the first embodiment is that lower recess 103 is deleted and cylindrical hollow spacer 122 whose ceiling plate is ring-shaped and who has no bottom plate is introduced to compensate the deletion. Rolled body 100 is supported by spacer 122 with an interposition of insulator plate 105. The upper terminal of rolled body 100 is supported in the same way as the first embodiment.

Here, spacer 122 may consist of an insulator to render insulator 105 unnecessary.

The same spacer as spacer 122 may be inserted between the upper terminal of rolled body 100 and upper recess 102 in the reverse direction to the direction of spacer 122. In this case, such space may consist of an insulator to render insulator 104 unnecessary. Also in this case, bottom part of the battery may take a form as shown in either of FIG. 1, FIG. 2, and FIG. 3.

As explained above, according to the present invention, even when an acceleration due to vibration or impact is applied to the battery, the rolled body never relatively moves with respect to the case. Therefore, problems that a stress is applied to a connecting portions of electrode leads and the electrode leads disconnect are prevented. Thus, mechanical and electrical reliability of the battery is improved, and the battery becomes long-life.

In addition, precision of positioning the rolled body is improved, and the positioning the rolled body when inserting the rolled body becomes easy, whereby the cost of assembling the battery is lowered.

Although the present invention has been shown and explained with respect to the best modes of embodiment thereof, it should be understood by those skilled in the art that the foregoing and various other changes, omissions, and additions in the form and detail thereof may be made therein without departing from the spirit and scope of the present invention.

What is claimed is:

1. A non-aqueous electrolyte secondary battery which comprises:

a case comprising a bottom and a sidewall;

a rolled body comprising:

a positive electrode comprised of a first electric plate and a positive electrode active material applied on said first electric plate;

a negative electrode comprised of a second electric plate and a negative electrode active material applied on said second electric plate; and a separator inserted between said positive electrode and said negative electrode;

wherein said rolled body is formed by laminating and rolling said positive electrode, said negative electrode, and said separator; and wherein said rolled body is enclosed in said body;

non-aqueous electrolyte enclosed in said case;

a header used for sealing said case;

a plurality of positive electrode leads connecting said positive electrode with said header;

a plurality of negative electrode leads connecting said negative electrode with a bottom of said case; and holding means for holding said rolled body so that said rolled body does not relatively move with respect to said case while keeping a gap between a lower terminal of said rolled body and said bottom of said case and a gap between an upper terminal of said rolled body and said header.

2. The non-aqueous electrolyte secondary battery according to claim 1, wherein said holding means comprises:

a first recess at least partially formed in the neighborhood of an upper end of said sidewall of said case; and a second recess at least partially formed in the neighborhood of a lower end of said sidewall of said case;

wherein said first recess and said second recess hold said rolled body.

3. The non-aqueous electrolyte secondary battery according to claim 1, wherein said holding means comprises:

a first recess at least partially formed in the neighborhood of an upper end of said sidewall of said case; and a short-diameter portion formed in the neighborhood of a lower end of said sidewall of said case;

wherein said first recess and a shoulder of said short-diameter portion hold said rolled body.

4. The non-aqueous electrolyte secondary battery according to claim 1, wherein said holding means comprises:

a first recess at least partially formed in the neighborhood of an upper end of said sidewall of said case; and a spacer disposed between said bottom of said case and said lower terminal of said rolled body;

wherein said first recess and said spacer hold said rolled body.

5. The non-aqueous electrolyte secondary battery according to claim 2, further comprising:

a spacer disposed between said first recess and said rolled body.

6. The non-aqueous electrolyte secondary battery according to claim 3, further comprising:

a spacer disposed between said first recess and said rolled body.

7. The non-aqueous electrolyte secondary battery according to claim 4, further comprising:

a spacer disposed between said first recess and said rolled body.

8. The non-aqueous electrolyte secondary battery according to claim 1, further comprising:

an insulator disposed between said rolled body and said holding means.

* * * * *